United States Patent
Kost et al.

(10) Patent No.: US 6,840,193 B2
(45) Date of Patent: Jan. 11, 2005

(54) ANIMAL KENNEL SIZING SYSTEM

(76) Inventors: Robert D. Kost, 201 65th Ave. North, Moorhead, MN (US) 56560; Gretchen K. C. Kost, 201 65th Ave. North, Moorhead, MN (US) 56560

( * ) Notice: Subject to any disclaimer, the term of this patent is extended or adjusted under 35 U.S.C. 154(b) by 0 days.

(21) Appl. No.: 10/349,875

(22) Filed: Jan. 21, 2003

(65) Prior Publication Data

US 2004/0139921 A1 Jul. 22, 2004

(51) Int. Cl.[7] .............................................. A01K 31/00
(52) U.S. Cl. ........................ 119/482; 119/496; 220/529
(58) Field of Search ................................ 220/529, 550, 220/559, 578; 119/496, 497, 482, 165, 712, 473, 752

(56) References Cited

U.S. PATENT DOCUMENTS

| | | | | |
|---|---|---|---|---|
| 275,969 A | * | 4/1883 | Woodside | 217/36 |
| 2,530,170 A | * | 11/1950 | Miller | 229/120.1 |
| 2,860,643 A | * | 11/1958 | Senechal | 220/550 |
| 3,508,219 A | * | 4/1970 | Stebbins | 365/57 |
| 3,729,115 A | * | 4/1973 | Little | 220/540 |
| 4,444,150 A | * | 4/1984 | Hueftle et al. | 119/522 |
| 4,991,543 A | | 2/1991 | Silberman | 119/17 |
| 5,054,426 A | | 10/1991 | Panarelli et al. | 119/17 |
| 5,671,697 A | | 9/1997 | Rutman | 119/473 |
| 5,960,744 A | | 10/1999 | Rutman | 119/473 |
| 6,302,061 B1 | | 10/2001 | Weatherby et al. | 119/498 |
| D469,802 S | * | 2/2003 | Goodman et al. | D19/34.1 |
| 6,695,419 B2 | * | 2/2004 | Searer et al. | 312/348.3 |

* cited by examiner

Primary Examiner—Peter M. Poon
Assistant Examiner—Bethany L. Griles

(57) ABSTRACT

An animal kennel sizing system for adjusting the interior space of an animal kennel. The animal kennel sizing system includes a partition member and a support brace attached to the partition member. The partition member preferably includes a first aperture and a second aperture for securing to the kennel with a corresponding securing member. The support brace may be severed or adjusted at various locations for providing adjustable lengths to create the desired interior space within the kennel.

1 Claim, 8 Drawing Sheets

ANIMAL KENNEL SIZING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to animal kennels and more specifically it relates to an animal kennel sizing system for adjusting the interior space of an animal kennel.

2. Description of the Related Art

Animal kennels have been in use for years. A conventional animal kennel is illustrated in FIG. 6 of the drawings disclosing a lower portion, an upper portion defining an interior cavity, and a front opening. Animal kennels are created in various sizes and shapes which is well known in the art. A conventional animal kennel further typically includes air holes within the upper portion and sometimes the lower portion for providing ventilation to the animal within the animal kennel. A door is pivotally attached to the animal kennel that allows for selective closing of the front opening.

The main problem with conventional kennels is that they are not adjustable for various sizes of animals. A further problem with conventional kennels is that the owner of a young pet must purchase additional larger sized kennels as the animal increases in size which can be costly. Another problem with conventional kennels is that when an animal is relatively small compared to the kennel, it can be difficult to train the animal not to urinate or defecate within the interior of the kennel.

Examples of patented devices that may be related to the present invention include U.S. Pat. No. 4,991,543 to Silberman; U.S. Pat. No. 6,302,061 to Weatherby et al.; U.S. Pat. No. 5,960,744 to Rutman; U.S. Pat. No. 5,671,697 to Rutman; and U.S. Pat. No. 5,054,426 to Panarelli et al.

While these devices may be suitable for the particular purpose to which they address, they are not as suitable for adjusting the interior space of an animal kennel. Conventional animal kennels are oversized for a young animal and sometimes undersized as the animal reaches a mature age requiring the purchase of an additional animal kennel.

In these respects, the animal kennel sizing system according to the present invention substantially departs from the conventional concepts and designs of the prior art, and in so doing provides an apparatus primarily developed for the purpose of adjusting the interior space of an animal kennel.

BRIEF SUMMARY OF THE INVENTION

In view of the foregoing disadvantages inherent in the known types of animal kennels now present in the prior art, the present invention provides a new animal kennel sizing system construction wherein the same can be utilized for adjusting the interior space of an animal kennel.

The general purpose of the present invention, which will be described subsequently in greater detail, is to provide a new animal kennel sizing system that has many of the advantages of the animal kennels mentioned heretofore and many novel features that result in a new animal kennel sizing system which is not anticipated, rendered obvious, suggested, or even implied by any of the prior art animal kennels, either alone or in any combination thereof.

To attain this, the present invention generally comprises a partition member and a support brace attached to, but not limited to, a lower portion of the partition member. The partition member preferably includes a first aperture and a second aperture for securing to the kennel with a corresponding securing member. The support brace may be severed or adjusted at various locations for providing adjustable lengths to create the desired interior space within the kennel. The support brace may be non-movably or adjustably attached to the partition member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an animal kennel sizing system that will overcome the shortcomings of the prior art devices.

A second object is to provide an animal kennel sizing system for adjusting the interior space of an animal kennel.

Another object is to provide an animal kennel sizing system that assists in training an animal not to urinate or defecate within the kennel.

An additional object is to provide an animal kennel sizing system that allows a kennel of a larger size to be adjusted to properly receive the animal.

A further object is to provide an animal kennel sizing system that may be utilized within various sizes, styles and structures of animal kennels.

Another object is to provide an animal kennel sizing system that provides a cost effective solution for pet owners to avoid having to purchase multiple kennels.

A further object is to provide an animal kennel sizing system that assists in house training an animal.

Another object is to provide an animal kennel sizing system that is stable, safe and sanitary.

A further object is to provide an animal kennel sizing system that may be easily adjusted to fit in various positions within a kennel.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
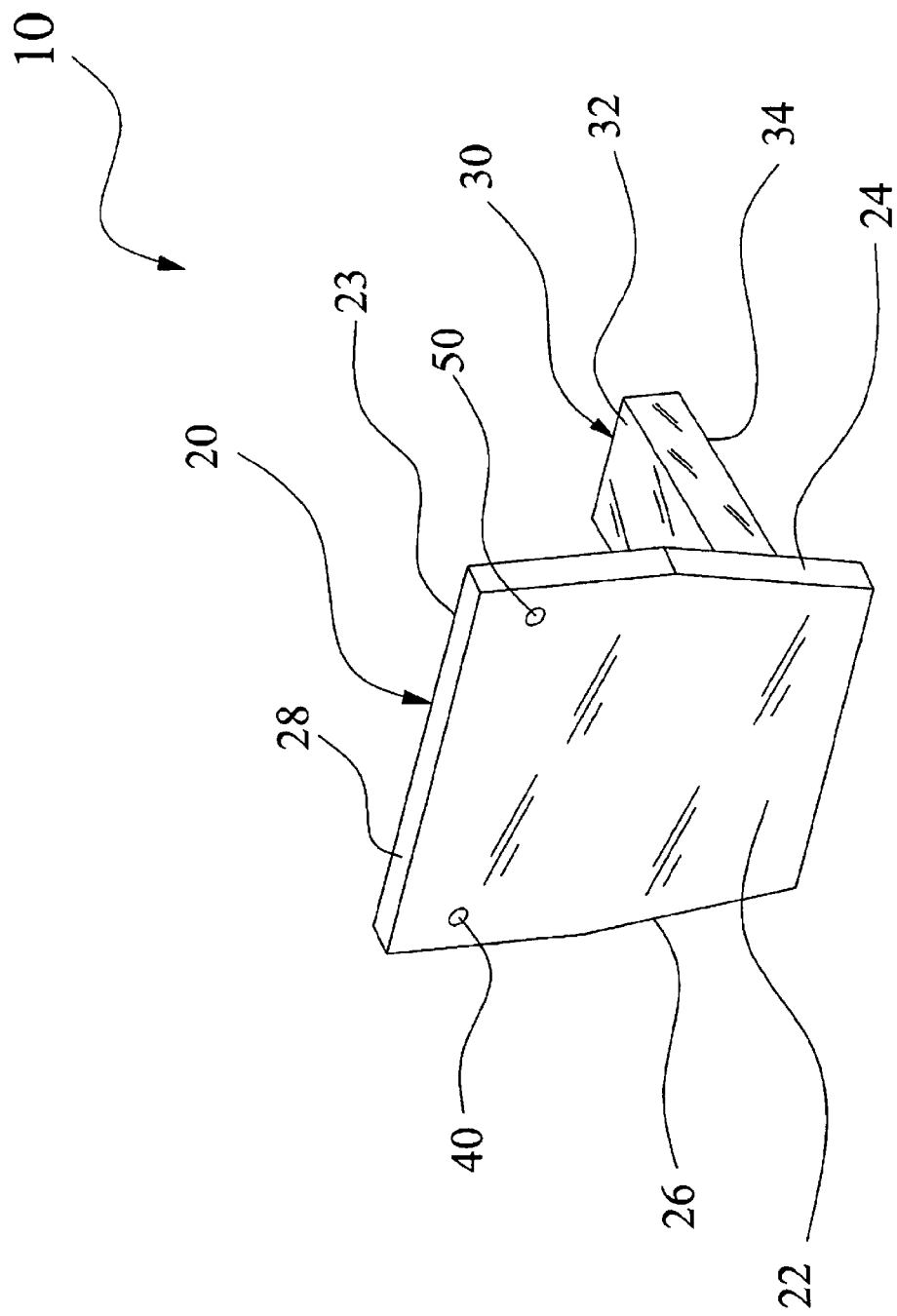
FIG. 1 is an upper perspective view of the present invention.

Turning now descriptively to the drawings, in which similar reference characters denote similar elements throughout the several views, FIGS. 1 through 8 illustrate an animal kennel sizing system 10, which comprises a partition member 20 and a support brace 30 attached to a lower portion of the partition member 20. The partition member 20 preferably includes a first aperture 40 and a second aperture 50 for securing to the kennel 12 with a corresponding securing member 19. The support brace 30 may be severed or adjusted at various locations for providing adjustable lengths to create the desired interior space within the kennel 12. The support brace 30 may be non-movably or adjustably attached to the partition member 20.

Figure 2:
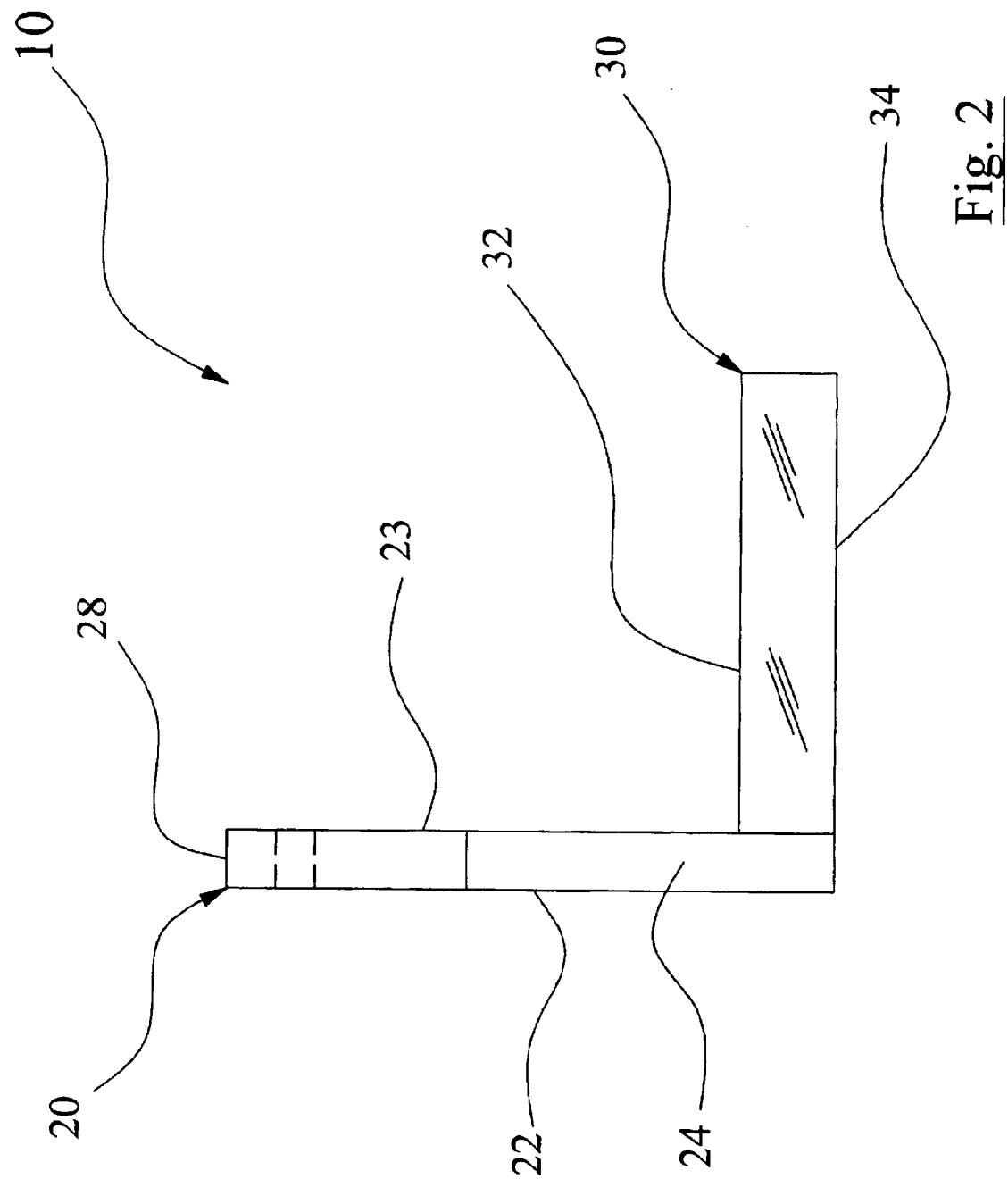
FIG. 2 is a side view of the present invention.
Figure 3:
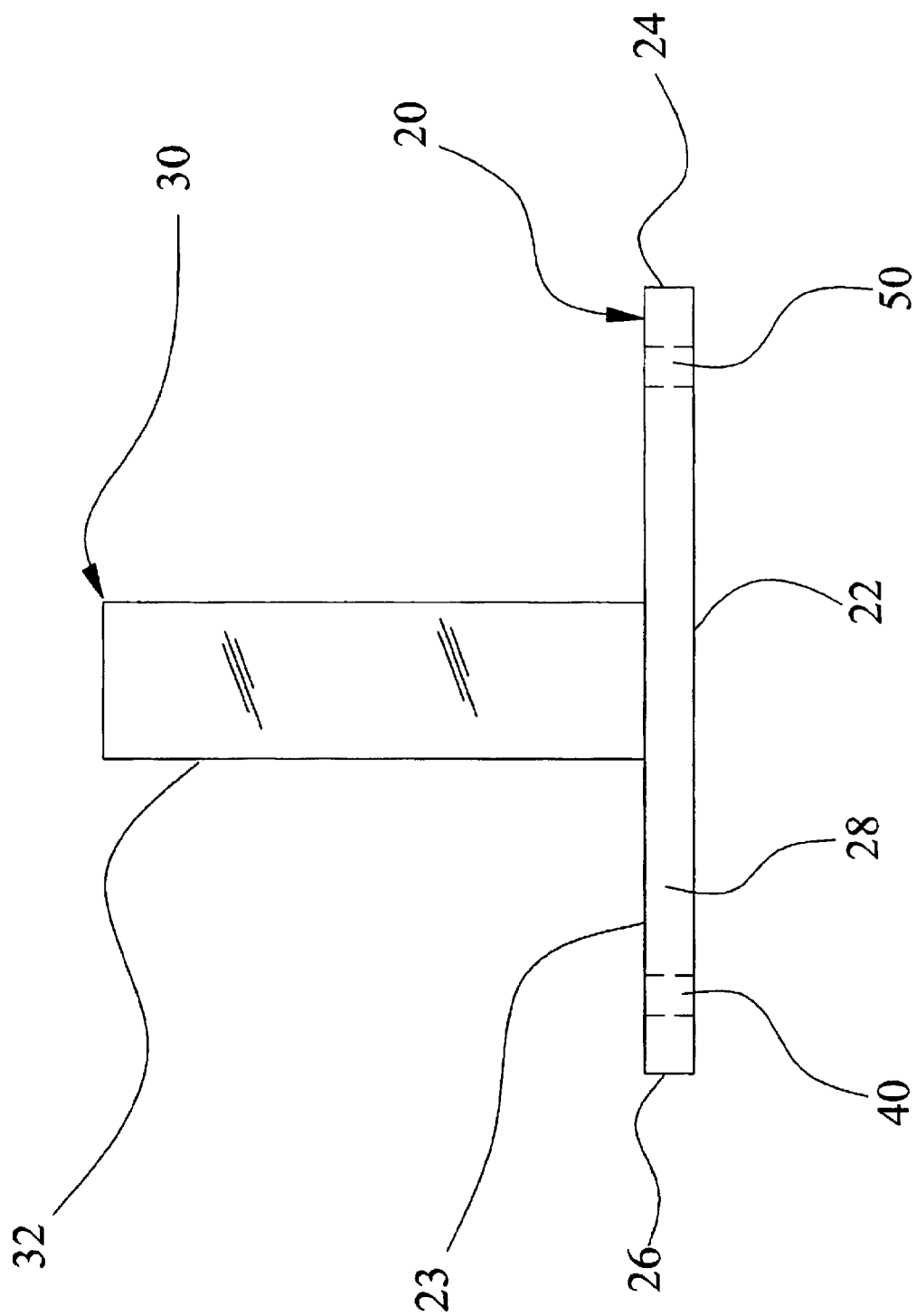
FIG. 3 is a top view of the present invention.

As shown in FIGS. 1 through 3 of the drawings, the partition member 20 is a relative broad and flat structure. The partition member 20 may be comprised of various materials such as but not limited to wood, plastic, metal, composite, and fiberglass. The partition member 20 extends in a substantially vertical direction as shown in FIGS. 1 and 2 of the drawings.

Figure 4:
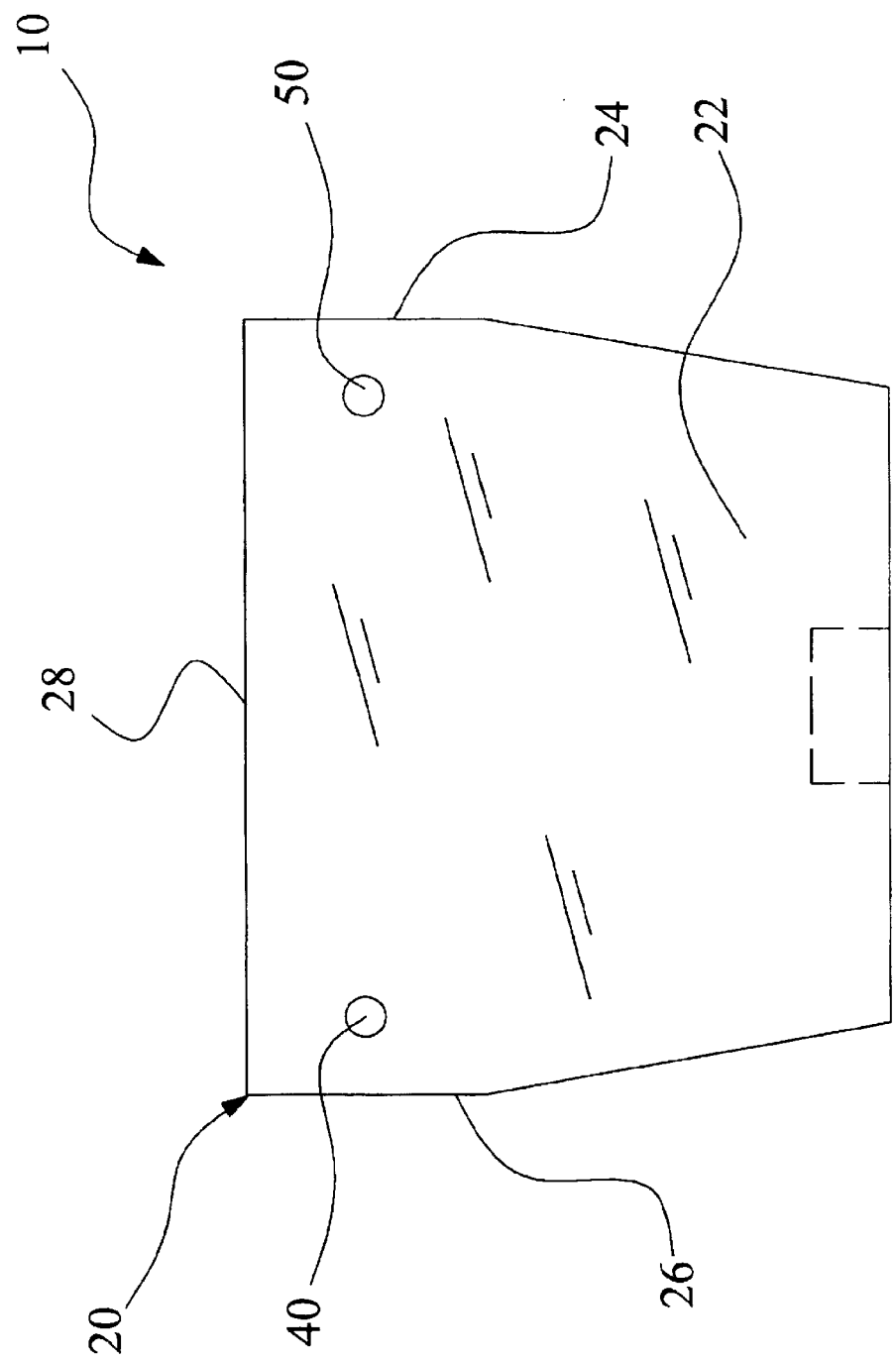
FIG. 4 is a front view of the present invention.

The partition member 20 has a front surface 22, a rear surface 23, a first side 24, a second side 26, a top side 28 and a bottom side. The partition member 20 preferably has a generally rectangular shape as shown in FIG. 4 of the drawings. The partition is formed to correspond to the interior cross sectional shape of a kennel 12 in order to fit between the upper section 16 and the lower section 18 of the kennel 12 in a movable manner. FIG. 4 illustrates the slanting of the lower portion of the first side 24 and the second side 26 in order to correspond to the tapered sidewalls of the lower section 18 of an exemplary kennel 12 illustrated in FIGS. 6 and 7 of the drawings.

The partition member 20 preferably has a width slightly smaller than the interior width of the kennel 12. In addition, the partition member 20 preferably has a height slightly smaller than the interior height of the kennel 12. The smaller width and height of the partition member 20 allows the partition member 20 to be slidably positioned within the interior of the kennel 12 as desired.

Figure 5:
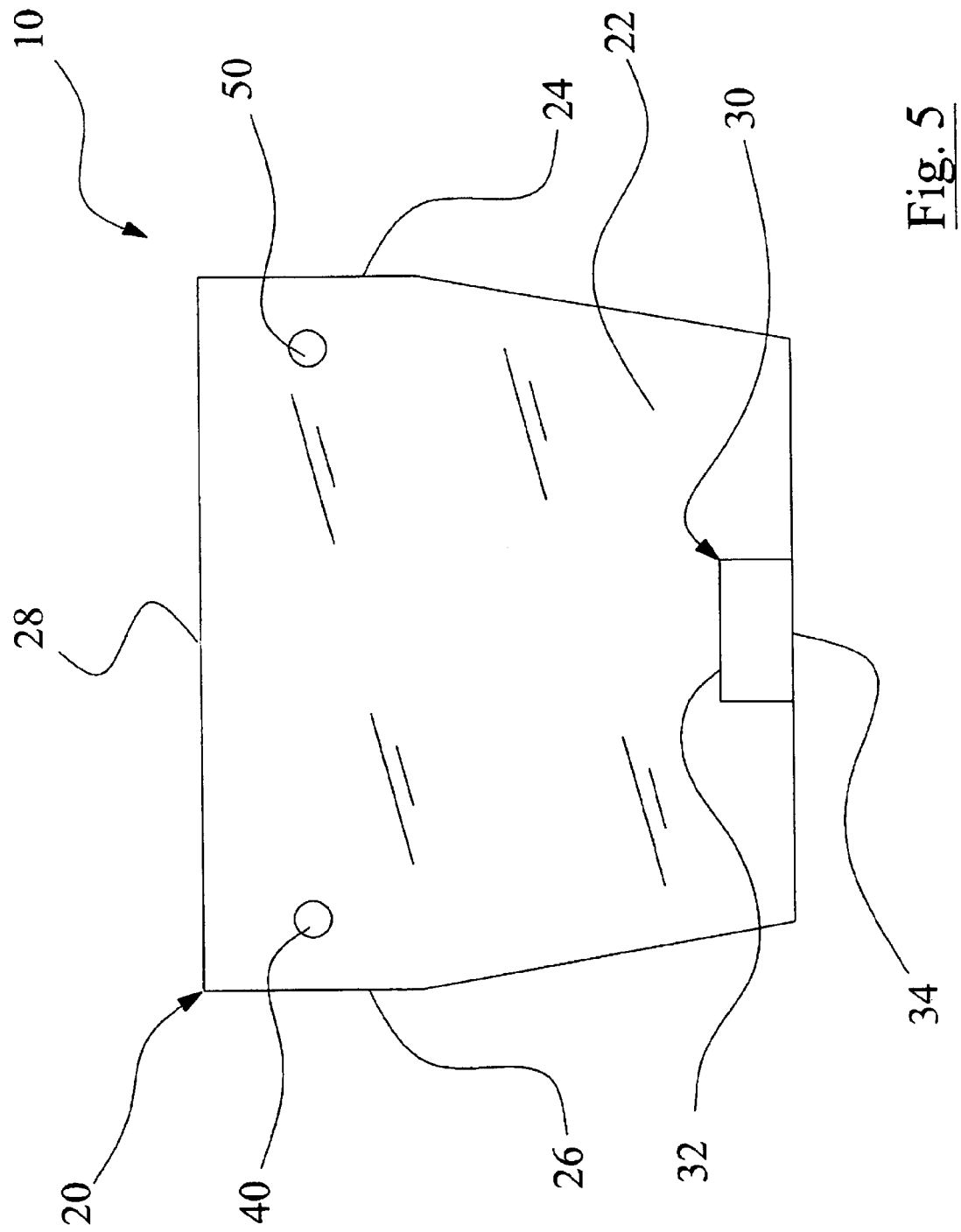
FIG. 5 is a rear review of the present invention.
Figure 6:
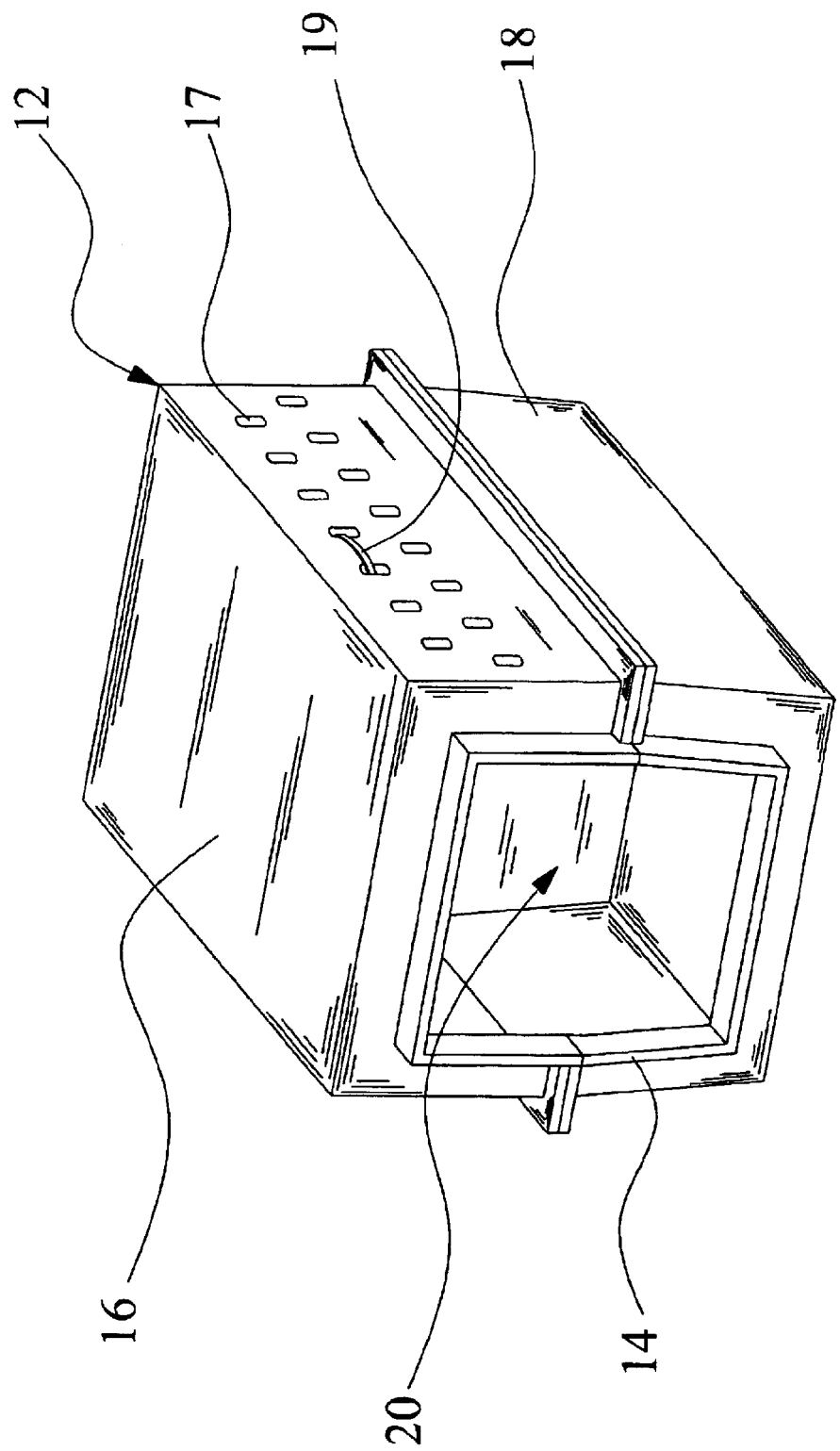
FIG. 6 is an upper perspective view of the present invention positioned within a kennel.

FIGS. 4 and 5 of the drawings illustrate a first aperture 40 and a second aperture 50 extending through the partition member 20 adjacent to the first side 24 and the second side 26. The first aperture 40 and the second aperture 50 are of sufficient size for allowing an elongate securing member 19 to extend through the respective aperture 40, 50 and then through one or more of the vent apertures 17 within the kennel 12 as shown in FIG. 6 of the drawings. The securing member 19 secures the upper portion of the partition to provide increased stability to the partition member 20 within the kennel 12. The securing member 19 may be comprised of various well known elongate fasteners such as but not limited to wire, hook and loop straps, string, and tie-wraps.

The support brace 30 has a first end, a second end, an upper surface 32 and a lower surface 34. The first end of the support brace 30 is attached to the partition member 20 as best illustrated in FIGS. 2 and 3 of the drawings. The support brace 30 is preferably substantially traverse with respect to the partition member 20 as further shown in FIG. 2 of the drawings.

The first end of the support brace 30 is preferably attached to the rear surface 23 of lower portion of the partition member 20 as best illustrated in FIG. 2 of the drawings. The support brace 30 is preferably attached to the partition member 20 such that the bottom side of the partition member 20 is substantially parallel to and aligned within the lower surface of the support brace 30 as best illustrated in FIG. 2 of the drawings. The support brace 30 may be attached to the partition member 20 by conventional fastening means such as but not limited to fasteners, adhesive, glue and cement. The support brace 30 may also be molded directly to the partition member 20 during the manufacturing thereof.

The support brace 30 is preferably comprised of a material that is capable of being severed in a relatively convenient manner such as but not limited to wood, plastic, composite, and fiberglass. The user severs the support brace 30 utilizing a conventional cutting device such as a saw to the desired length thereby creating the location of the second end opposite of the first end of the support brace 30. The support brace may also be of a design that is adjustable.

Figure 7:
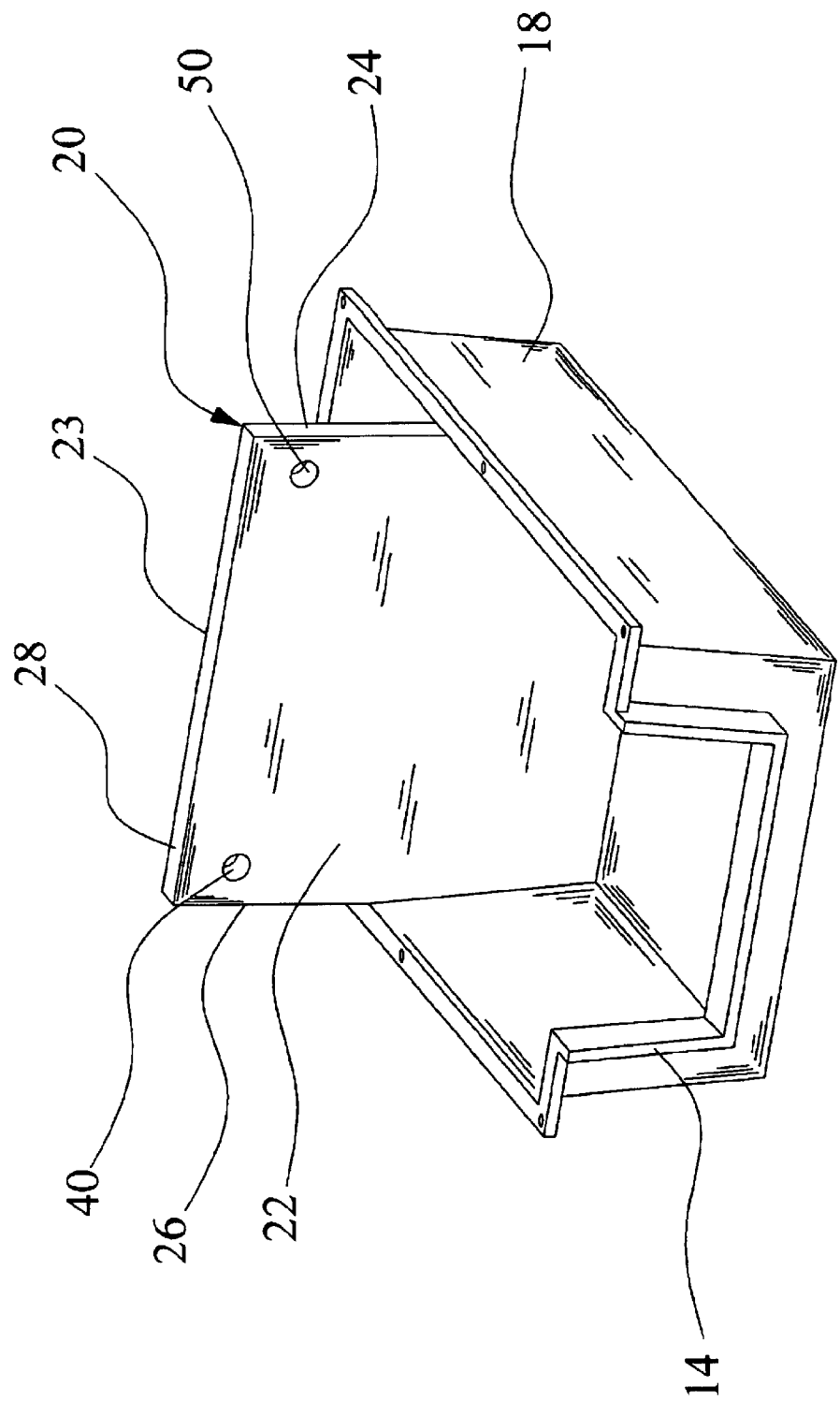
FIG. 7 is an upper perspective view of the present invention positioned within a kennel with the upper portion removed from the lower portion.
Figure 8:
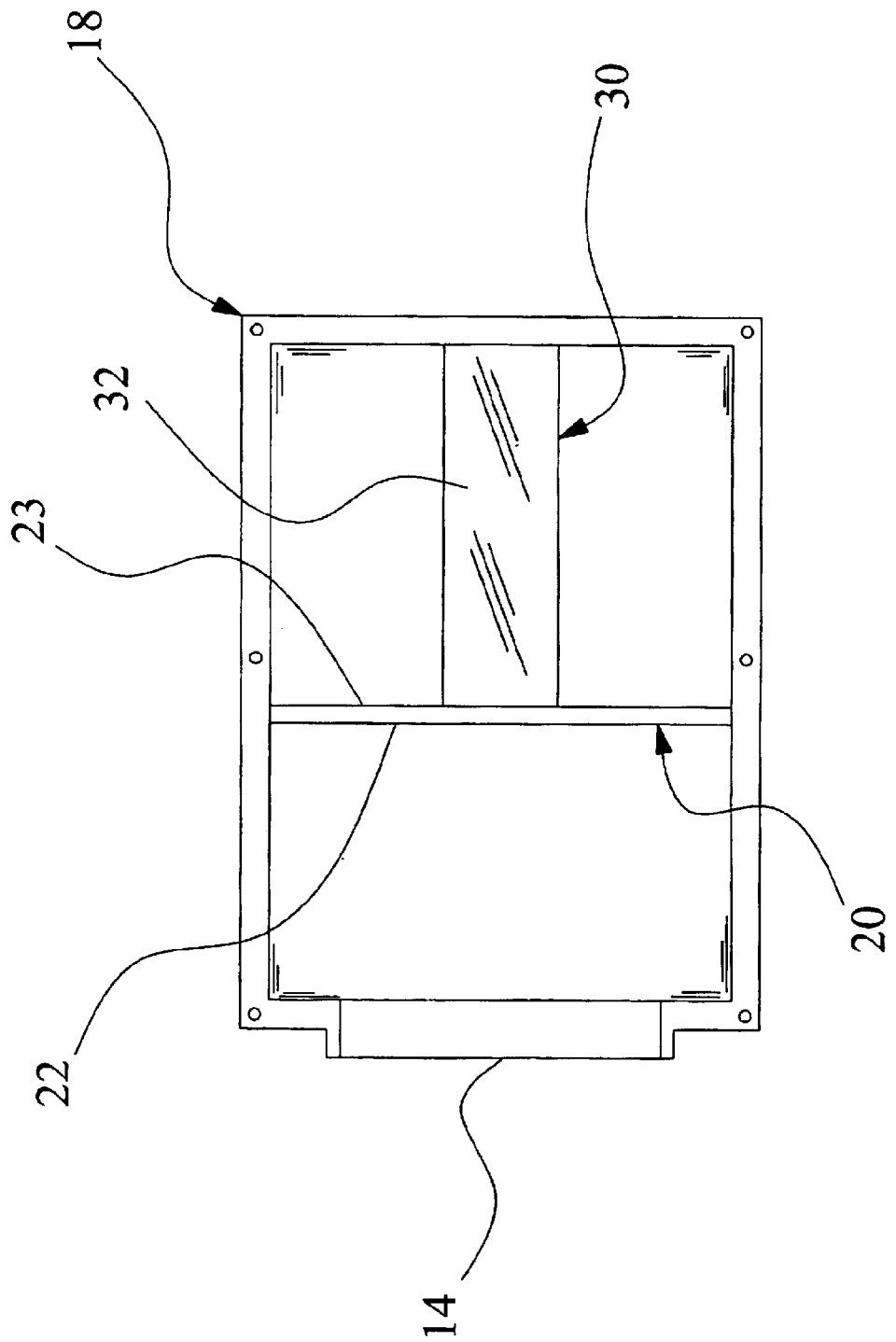
FIG. 8 is a top view of the present invention within a kennel with the upper portion removed from the lower portion illustrating the distance the partition member is kept from the rear wall of the kennel by the support member.

In use, the user removes the upper section 16 of the kennel 12 as illustrated in FIGS. 7 and 8 of the drawings. The user then determines the desired interior size of the kennel 12 and severs or adjusts the support brace 30 in a corresponding location. Alternatively, the user may adjust the position of the support brace 30 with respect to the partition member 20. The user then positions the present invention within the interior of the lower section 18 of the kennel 12 with the second end of the support brace 30 abutting the interior rear wall of the kennel 12 as illustrated in FIGS. 7 and 8 of the drawings. The user then secures the upper section 16 of the kennel 12 to the lower section 18 as shown in FIG. 6 of the drawings. The user then secures at least one securing member 19 within the first aperture 40 and the second aperture 50 to the upper section 16 of the kennel 12 by extending each securing member 19 through the vent apertures 17 of the kennel 12 as shown in FIG. 6 of the drawings. It can be appreciated that the user does not have to utilize securing members 19 to secure the present invention within the kennel 12. The user then positions the animal within the interior of the kennel 12 through the front opening 14 wherein the interior size of the kennel 12 has been effectively reduced. When the animal increases in size and outgrows the interior space, the user then simply severs or adjusts the support brace 30 to the next desired location thereby increasing the interior size of the kennel 12. This process continues until the animal is fully grown and/or the present invention is fully removed from the kennel 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of installing an animal kennel sizing apparatus within a kennel, said animal kennel sizing apparatus including a partition member having a front surface and a rear surface, and a support brace having a first end and a second end, wherein said first end is attached to said rear surface of said partition member extending rearwardly from said partition member for supporting said partition member in a substantially vertical position within an interior of a kennel, said method comprising the steps of:

(a) removing an upper section of said kennel;
    (b) positioning said animal kennel sizing apparatus within an interior of said kennel with said second end of said support brace abutting an interior rear wall of said kennel;
    (c) severing said support brace at a desired location as dependent upon a desired amount of interior space within said kennel; and
    (d) securing said upper section of said kennel to a lower section of said kennel.

* * * * *